(12) United States Patent
Morita et al.

(10) Patent No.: US 9,834,702 B2
(45) Date of Patent: Dec. 5, 2017

(54) JET-BLACK MULTILAYER COATING FILM AND FORMING METHOD THEREOF

(71) Applicant: TOYOTA JIDOSHA KABUSHIKI KAISHA, Toyota-shi, Aichi-ken (JP)

(72) Inventors: Koji Morita, Hirakata (JP); Yasunori Miwa, Hirakata (JP); Hirofumi Yamashita, Hirakata (JP); Naoya Yabuuchi, Hirakata (JP); Masahiko Ishii, Toyota (JP); Masako Hase, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 135 days.

(21) Appl. No.: 14/384,462

(22) PCT Filed: Mar. 14, 2013

(86) PCT No.: PCT/JP2013/057198
§ 371 (c)(1),
(2) Date: Sep. 11, 2014

(87) PCT Pub. No.: WO2013/137393
PCT Pub. Date: Sep. 19, 2013

(65) Prior Publication Data
US 2015/0104653 A1    Apr. 16, 2015

(30) Foreign Application Priority Data

Mar. 16, 2012    (JP) .................................. 2012-059622

(51) Int. Cl.
*C09D 167/00*    (2006.01)
*C09D 167/02*    (2006.01)
(Continued)

(52) U.S. Cl.
CPC ............. *C09D 167/04* (2013.01); *B05D 5/06* (2013.01); *C08G 18/4063* (2013.01);
(Continued)

(58) Field of Classification Search
None
See application file for complete search history.

(56) References Cited

U.S. PATENT DOCUMENTS 4,397,989 A * 8/1983 Adesko ............. C09D 133/066
427/409
4,960,828 A * 10/1990 Higuchi ............. C09D 133/066
525/162
(Continued)

FOREIGN PATENT DOCUMENTS

JP          6-298921 A     10/1994
JP          8-3297 A       1/1996
(Continued)

*Primary Examiner* — Vivan Chen
(74) *Attorney, Agent, or Firm* — Sughrue Mion, PLLC

(57) ABSTRACT

The present disclosure provides a jet-black multilayer coating film having excellent properties in high appearance, water resistance, and humidity resistance and comprising a base coating film and a clear coating film formed by a coating composition containing a plant-derived aliphatic polyester mainly and a method for forming the same.

A jet-black multilayer coating film comprising a base coating film layer formed by a base coating composition which contains a polyester polyol (A-1) containing a polyol having three or more functions and lactic acid as a consisting component of 80 mol % or more and having a hydroxyl value of 140 to 240 mgKOH/g wherein 70 mol % or more of the hydroxyl groups are secondary hydroxyl groups, an acrylic resin (A-2) with a hydroxyl value of 30 to 80 mgKOH/g and a glass transition point of 40 to 80° C., and a polyisocyanate (A-3), and a clear coating film layer formed on said base coating film layer by a clear coating composition which contains a
(Continued)

polyester polyol (B-1) obtained by polymerization of a raw composition of a polyol having three or more functions, sebacic acid, and a diol and having a hydroxyl value of 140 to 240 mgKOH/g, an acrylic resin (B-2) with a hydroxyl value of 120 to 220 mgKOH/g, and a polyisocyanate (B-3).

4 Claims, 1 Drawing Sheet

(51) Int. Cl.

| | |
|---|---|
| C09D 167/04 | (2006.01) |
| C09D 175/06 | (2006.01) |
| C09D 133/00 | (2006.01) |
| C09D 175/00 | (2006.01) |
| C09D 133/04 | (2006.01) |
| B05D 7/00 | (2006.01) |
| B05D 3/02 | (2006.01) |
| B32B 7/02 | (2006.01) |
| B32B 27/18 | (2006.01) |
| B32B 27/20 | (2006.01) |
| B32B 27/26 | (2006.01) |
| B32B 27/30 | (2006.01) |
| B32B 27/36 | (2006.01) |
| B32B 27/40 | (2006.01) |
| C08G 18/42 | (2006.01) |
| C08G 63/06 | (2006.01) |
| C08G 63/08 | (2006.01) |
| C08G 63/12 | (2006.01) |
| C08G 63/16 | (2006.01) |
| B05D 5/06 | (2006.01) |
| C09D 175/04 | (2006.01) |
| C09D 133/06 | (2006.01) |
| C08G 18/62 | (2006.01) |
| C08G 18/40 | (2006.01) |
| C09D 133/14 | (2006.01) |
| C08K 3/00 | (2006.01) |
| C08K 5/29 | (2006.01) |
| C08K 3/04 | (2006.01) |
| B32B 27/08 | (2006.01) |

(52) U.S. Cl.
CPC ..... *C08G 18/4241* (2013.01); *C08G 18/4283* (2013.01); *C08G 18/6229* (2013.01); *C08G 18/6254* (2013.01); *C09D 133/066* (2013.01); *C09D 133/14* (2013.01); *C09D 167/02* (2013.01); *C09D 175/04* (2013.01); *B05D 3/02* (2013.01); *B05D 7/53* (2013.01); *B05D 7/532* (2013.01); *B05D 7/536* (2013.01); *B05D 2502/00* (2013.01); *B05D 2503/00* (2013.01); *B05D 2508/00* (2013.01); *B32B 7/02* (2013.01); *B32B 27/08* (2013.01); *B32B 27/18* (2013.01); *B32B 27/20* (2013.01); *B32B 27/26* (2013.01); *B32B 27/308* (2013.01); *B32B 27/36* (2013.01); *B32B 27/40* (2013.01); *B32B 2250/02* (2013.01); *B32B 2250/24* (2013.01); *B32B 2307/402* (2013.01); *B32B 2307/4026* (2013.01); *B32B 2307/41* (2013.01); *B32B 2307/412* (2013.01); *B32B 2333/04* (2013.01); *B32B 2367/00* (2013.01); *B32B 2375/00* (2013.01); *C08G 18/4236* (2013.01); *C08G 63/06* (2013.01); *C08G 63/08* (2013.01); *C08G 63/12* (2013.01); *C08G 63/16* (2013.01); *C08K 3/0033* (2013.01); *C08K 3/04* (2013.01); *C08K 5/29* (2013.01); *C09D 133/04* (2013.01); *C09D 167/00* (2013.01); *C09D 175/00* (2013.01); *C09D 175/06* (2013.01); *Y10T 428/24942* (2015.01); *Y10T 428/31551* (2015.04); *Y10T 428/31565* (2015.04); *Y10T 428/31576* (2015.04); *Y10T 428/31786* (2015.04); *Y10T 428/31794* (2015.04); *Y10T 428/31797* (2015.04); *Y10T 428/31928* (2015.04)

(56) References Cited

U.S. PATENT DOCUMENTS

| | | | | |
|---|---|---|---|---|
| 5,187,199 | A * | 2/1993 | Sudo | C08G 18/4063 523/500 |
| 5,502,101 | A * | 3/1996 | Schwarte | B05D 7/532 427/372.2 |
| 5,552,184 | A * | 9/1996 | Klostermann | A61K 47/48423 427/284 |
| 5,648,410 | A * | 7/1997 | Hille | C08F 283/01 523/501 |
| 5,759,694 | A * | 6/1998 | Mayo | C08G 63/685 428/423.1 |
| 5,987,727 | A * | 11/1999 | Shafik | B05D 7/16 156/196 |
| 6,297,314 | B1 * | 10/2001 | Hintze-Bruning | C08G 18/4063 524/100 |
| 6,350,809 | B1 * | 2/2002 | Goebel | C09D 167/00 524/509 |
| 6,656,531 | B2 * | 12/2003 | Yoshioka | C09D 133/064 427/386 |
| 7,838,592 | B2 | 11/2010 | Kawamura et al. | |
| 2001/0036999 | A1 * | 11/2001 | Yokoyama | B05D 7/00 525/165 |
| 2002/0026015 | A1 * | 2/2002 | Ramesh | C08G 63/123 525/437 |
| 2003/0185993 | A1 * | 10/2003 | Kamimori | B05D 7/572 427/402 |
| 2009/0075063 | A1 * | 3/2009 | Iida | C09D 5/36 428/327 |
| 2010/0055467 | A1 * | 3/2010 | Kulfan | C08G 18/428 428/412 |
| 2010/0055469 | A1 * | 3/2010 | Cheng | C09D 167/07 428/412 |
| 2010/0055471 | A1 * | 3/2010 | Fuhry | C08G 18/0823 428/419 |
| 2010/0055473 | A1 * | 3/2010 | Fenn | C08G 18/428 428/423.5 |
| 2011/0257273 | A1 | 10/2011 | Yabuuchi et al. | |

FOREIGN PATENT DOCUMENTS

| | | |
|---|---|---|
| JP | 2006-239519 A | 9/2006 |
| JP | 2008-13744 A | 1/2008 |
| JP | 2008-285632 A | 11/2008 |

* cited by examiner

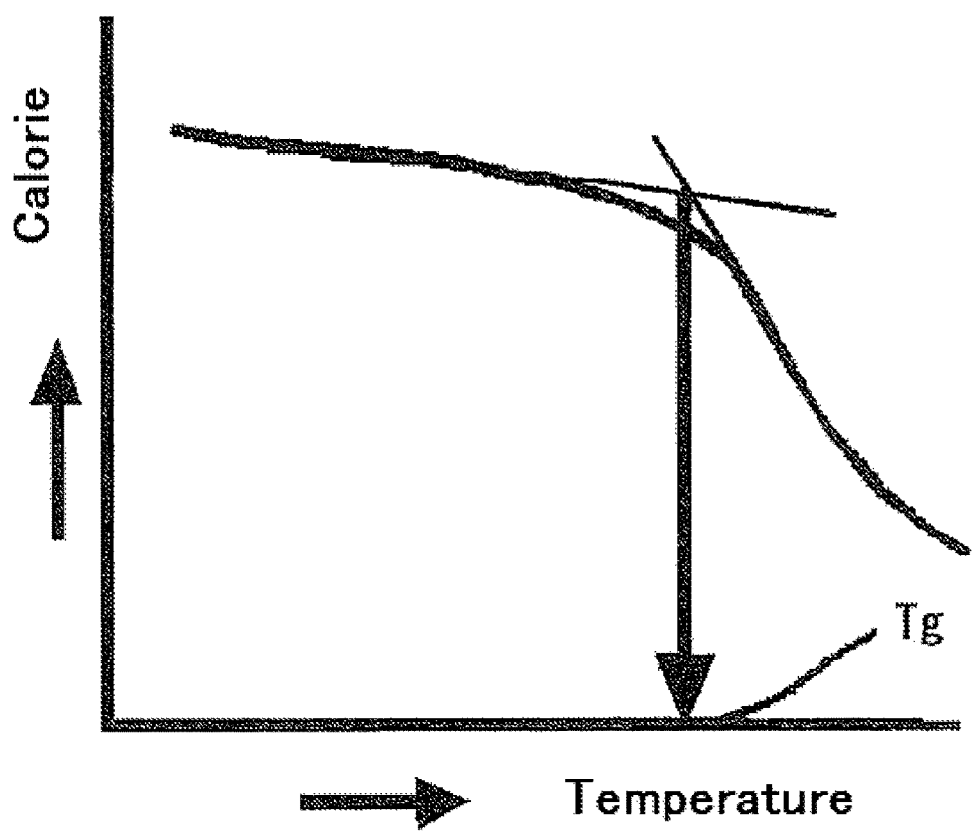

JET-BLACK MULTILAYER COATING FILM AND FORMING METHOD THEREOF

TECHNICAL FIELD

The present invention relates to a jet-black multilayer coating film and a forming method thereof.

BACKGROUND OF THE DISCLOSURE

In coating compositions for automobile interior parts, black one has been used widely. Especially, for a high-class car, it is desired to form a coating film showing a jet-like appearance with luster and gloss. As the coating composition that is used for such application, for example, coating compositions disclosed in Patent Documents 1 to 3 are publicly known.

On the other hand, recently, reduction of the carbon dioxide emissions is expected for countermeasures against global warming. As a method for resolving this problem, it has been examined to replace apart or all of resin materials to be used in coatings with plant-derived materials (Patent Documents 4 to 6). As such plant-derived material, an aliphatic polyester resin is general.

However, it has not been sufficiently examined to use a coating composition comprising mostly of the aliphatic polyester resin in forming the above-mentioned coating film having a jet-black coating appearance. In the jet-black coating film for automobile interior, performances such as water resistance, and humidity resistance are required in addition to high appearance. It has not been sufficiently examined to achieve the physical properties by the coating composition comprising mostly of the plant-derived material.

The present inventors disclose a plant-derived polyester resin which can be used suitably for a coating composition in Patent Documents 7 and 8. However, these documents do not disclose about the formation of a coating film having jet-black appearance.

PRIOR TECHNICAL DOCUMENT

Patent Document

[Patent Document 1] Japanese Kokai Publication 2004-98033
[Patent Document 2] Japanese Kokai Publication 2006-239519
[Patent Document 3] Japanese Kokai Publication 2008-285632
[Patent Document 4] Japanese Kokai Publication 2008-13744
[Patent Document 5] Japanese Kokai Publication Hei8-3297
[Patent Document 6] Japanese Kokai Publication Hei6-298921
[Patent Document 7] Japanese Kokai Publication 2010-248478
[Patent Document 8] U.S. Unexamined Patent Application Publication No. 2011/257273

SUMMARY OF INVENTION

Problem to be Solved by the Invention

The object of the present disclosure which has been in view of the above-mentioned state of the art, is to provide a jet-black multilayer coating film which has excellent properties in high appearance, water resistance, and humidity resistance, and which comprises a base coating film and a clear coating film formed by a coating composition containing a plant-derived aliphatic polyester mainly, and a method for forming the same.

Means for Solving Object

The present disclosure relates to a jet-black multilayer coating film comprising
a base coating film layer formed by a base coating composition which contains a polyester polyol (A-1) containing a polyol having three or more functions and lactic acid as a consisting component of 80 mol % or more and having a hydroxyl value of 140 to 240 mgKOH/g wherein 70 mol % or more of the hydroxyl groups are secondary hydroxyl groups, an acrylic resin (A-2) with a hydroxyl value of 30 to 80 mgKOH/g and a glass transition point of 40 to 80° C., and a polyisocyanate (A-3), and
a clear coating film layer formed on said base coating film layer by a clear coating composition which contains a polyester polyol (B-1) obtained by polymerization of a raw composition of a polyol having three or more functions, sebacic acid, and a diol and having a hydroxyl value of 140 to 240 mgKOH/g, an acrylic resin (B-2) with a hydroxyl value of 120 to 220 mgKOH/g, and a polyisocyanate (B-3).

The base coating composition preferably contains a carbon black and/or a black dye.

A method for forming a jet-black multilayer coating film comprising
a step (1) of forming a base coating film layer by a base coating composition which contains a polyester polyol (A-1) containing a polyol having three or more functions and lactic acid as a consisting component of 80 mol % or more, and having a hydroxyl value of 140 to 240 mgKOH/g wherein 70 mol % or more of the hydroxyl groups are secondary hydroxyl groups, an acrylic resin (A-2) with a hydroxyl value of 30 to 80 mgKOH/g and a glass transition point of 40 to 80° C., and a polyisocyanate (A-3), a step (2) of forming a clear coating film layer on said base coating film layer, by a dry-on-wet or a wet-on-wet method, by a clear coating composition which contains a polyester polyol (B-1) obtained by polymerization of a raw composition of a polyol having three or more functions, sebacic acid, and a diol and having a hydroxyl value of 140 to 240 mgKOH/g, an acrylic resin (B-2) with a hydroxyl value of 120 to 220 mgKOH/g, and a polyisocyanate (B-3), and
a step (3) of curing said base coating film layer and said clear coating film layer.

The base coating composition preferably contains a carbon black and/or a black dye.

Effect of the Invention

The jet-black multilayer coating film of the present disclosure has excellent properties in high appearance, water resistance, and humidity resistance, and comprises a base coating film and a clear coating film formed by a coating composition containing a plant-derived aliphatic polyester mainly, so contributes to reduction of carbon dioxide emission.

BRIEF DESCRIPTION OF THE DRAWINGS

FIG. 1 shows specifically a method of reading Tg value from a chart of Tg measurement method.

MEANS FOR SOLVING OBJECT

In the following, the present disclosure is described in detail.

The base coating composition used in the present disclosure contains a polyester polyol (A-1) containing a polyol having three or more functions and lactic acid as a consisting component of 80 mol % or more and having a hydroxyl value of 140 to 240 mgKOH/g wherein 70 mol % or more of the hydroxyl groups are secondary hydroxyl groups, an acrylic resin (A-2) with a hydroxyl value of 30 to 80 mgKOH/g and a glass transition point of 40 to 80° C., and a polyisocyanate (A-3).

A coating composition containing a large amount of secondary hydroxyl group may be obtained by using the polyester polyol having the above-mentioned characteristics among aliphatic polyester polyols. A curing reaction of the obtained base coating film layer may be lowered, because the secondary hydroxyl group has lower reaction speed with a curing agent than a primary hydroxyl group. Thereby, a coating film having an excellent smoothness may be formed. When a jet-black coating film has good surface smoothness to achieve excellent gloss, high appearance can be obtained. Further, the rate of plant-derived materials may be increased by using much lactic acid.

The polyol having three or more functions includes, for example, branched alcohols such as trimethylol propane, pentaerythritol, glycerol, polyglycerol, and xylitol, polyhydric alcohols such as hydroxy(meth)acrylate-containing acrylic copolymer, aromatic carboxylic acids such as trimellitic acid, polybasic carboxylic acids such as (meth)acrylic acid-containing acrylic copolymer, further includes compounds containing a hydroxyl group and a carboxyl group in a molecule such as dimethylolpropanoic acid, and dimethylolbutanoic acid. These compounds may be used singly or two or more of them may be used in admixture.

There are D-lactic acid and L-lactic acid as the enantiomer of lactic acid. In the present disclosure, either one of the enantiomers may be used or a mixture of both may be used. L-lactic acid is present in larger amounts in nature, therefore L-lactic acid is preferably used from the viewpoint of costs and so on.

The polyester polyol (A-1) contains the polyol having three or more functions and lactic acid as a consisting component of 80 mol % or more. It is preferred to use these raw materials of 80 mol % or more because a polyol with high plant-derivation degree and narrow molecular weight distribution can be synthesized and a coating film excellent in water resistance and chemical resistance can be formed. The content as the consisting component indicates a rate to be added as the raw material when a resin is synthesized.

In the polyester polyol (A-1), a mixing ratio of the polyol having three or more functional groups and the lactic acid is not particularly limited, but is more preferably 1/8 to 1/15 on a molar ratio. It is preferred to adjust the mixing ratio within the above-mentioned range because suitable crosslinking density is achieved so that the physical properties of the coating film such as water resistance, chemical resistance and so on become good.

The polyester polyol (A-1) may contain other polyol than the polyol having three or more functions and lactic acid, polyfunctional acid, and hydroxycarboxylic acid of less than 20 mol %.

The monomer component other than the polyol having three or more functions and lactic acid includes, for example, dialcohols such as 1,4-butanediol, 2-methyl-1,3-propanediol, dicarboxylic acids such as adipic acid and succinic acid, and hydroxyalkanoic acids other than lactic acid such as glycolic acid, 4-hydroxybutyric acid, 3-hydroxyvaleric acid, and 3-hydroxyhexanoic acid.

The polyester polyol (A-1) can be obtained by a known method. For example, it can be obtained by proceeding a reaction of the monomer components with azeotropic-removing the generated moisture by using xylene and so on at 150 to 220° C.

The polyester polyol (A-1) has a hydroxyl value of 140 to 240 mgKOH/g, and 70 mol % or more of the hydroxyl groups therein are secondary hydroxyl groups. When the hydroxyl value is less than 140 mgKOH/g, crosslinking density becomes insufficient so that the characteristics such as water resistance, humidity resistance and so on become insufficient. Polyester polyols having a hydroxyl value of more than 240 mgKOH/g are not suitable for the object of the present disclosure because of low adhesion. The lower limit of the hydroxyl value is more preferably 150, still more preferably 160. The upper limit of the hydroxyl value is more preferably 225, still more preferably 210.

By using secondary hydroxyl groups of 70 mol % or more relative to the whole hydroxyl groups, high appearance coating film may be obtained by the above-mentioned action. In addition, a hydroxyl group in lactic acid is secondary hydroxyl group, so the polyester polyol containing the above-mentioned amount of the secondary hydroxyl group can be obtained by adjusting the content of lactic acid.

A number average molecular weight of the polyester polyol (A-1) is preferably 650 to 1300, more preferably 750 to 1100. When the number average molecular weight is less than 650, the physical properties of the coating film tend to decrease. If over 1300, coating workability tends to decrease and then finish appearance tends to decrease.

In the present specification, a weight average molecular weight and a number average molecular weight can be measured in terms of polystyrene molecular weight using GPC. A column to be used in the GPC measurement is TSK gel Supermultipore HZ-M (manufactured by Tosoh Corporation).

The base coating composition to be used in the present disclosure contains an acrylic resin (A-2) with a hydroxyl value of 30 to 80 mgKOH/g and a glass transition point of 40 to 80° C. That is, the acrylic resin (A-2) is an essential component because hydrolysis resistance is insufficient in case of using the above-mentioned polyester polyol only.

The hydroxyl value of the acrylic resin (A-2) is preferably 30 to 80 mgKOH/g, more preferably 40 to 70 mgKOH/g. When the hydroxyl value is less than 30 mgKOH/g, crosslinking reaction points with a curing agent (B) may be short so that the physical properties of the coating film are insufficient. When exceeding 80 mgKOH/g, crosslinking reaction points may be too much so that the coating film become hard and brittle, and humidity resistance and water resistance of the coating film are undesirably reduced because of excess hydroxyl groups.

The glass transition point of the acrylic resin (A-2) is 40 to 80° C. A coating film excellent in water resistance, humidity resistance, chemical resistance, and appearance can be obtained when the glass transition point is in the above-mentioned range. The lower limit of the glass transition point is preferably 45° C., more preferably 50° C. The upper limit of the glass transition point is preferably 75° C., more preferably 70° C.

The glass transition point in this specification is a value measured by the differential scanning calorimetry. The glass transition point may be within the above-mentioned range by controlling suitably the composition of monomer components to be used.

The weight average molecular weight of the acrylic resin (A-2) is preferably 5000 to 70000, more preferably 10000 to 50000. When the weight average molecular weight is less than 5000, the physical properties of coating film tend to decrease. When exceeding 70000, coating workability tends to decrease and then finish appearance tends to decrease.

The acrylic resin (A-2) can be obtained by polymerizing a monomer composition comprising a hydroxyl group-containing radical polymerizable monomer and other radical polymerizable monomer to be used according to need in the usual manner.

The hydroxyl group-containing radical polymerizable monomer is not particularly limited but includes, for example, 2-hydroxylethyl (meth)acrylate, 4-hydroxybutyl (meth)acrylate, hydroxypropyl (meth)acrylate, ring-opened 2-hydroxyethyl (meth)acrylate by ϵ-caprolactone (PLACCEL FA and FM series manufactured by DAICEL CORPORATION), and so on. The monomer may be used singly or alternatively may be used in a combination of two or more species thereof.

The other radical polymerizable monomer is not particularly limited but includes, for example, carboxyl group-containing monomers such as (meth)acrylic acid, maleic acid, and itaconic acid, epoxy group-containing monomers such as glycidyl (meth)acrylate,
methyl (meth)acrylate, ethyl (meth)acrylate, isopropyl (meth)acrylate, n-butyl (meth)acrylate, 2-ethylhexyl (meth) acrylate, styrene, vinyltoluene, vinyl acetate, and α-methyl styrene. The monomer may be used singly or alternatively may be used in a combination of two or more species thereof.

The acrylic resin (A-2) can be obtained by polymerizing the monomer composition but a conventionally known method for producing an acrylic resin may be used as a method for producing the acrylic resin (A-2). That is, any polymerization method of solution polymerization, non-aqueous dispersion polymerization, and bulk polymerization may be used but solution polymerization is suitable because of easiness to polymerize, easiness to control the molecular weight, and easiness to use when a coating is prepared.

In the base coating composition, a ratio of the polyester polyol (A-1) and the acrylic resin (a-2) is preferably 90:10 to 50:50 in terms of weight. The ratio is more preferably 80:20 to 60:40. There is an advantage that the physical properties of obtained coating film become sufficient without reducing plant-derivation degree by adjusting the ratio within the above-mentioned range.

The base coating composition further contains a polyisocyanate (A-3) as a curing agent. The polyisocyanate (A-3) is not particularly restricted as long as the polyisocyanate is a compound containing 2 or more isocyanate groups but includes, for example, aromatic compounds such as tolylenediisocyanate, 4,4'-diphenylmethane diisocyanate, xylylene diisocyanate, and metaxylylene diisocyanate; aliphatic compounds such as hexamethylene diisocyanate; alicyclic compounds such as isophorone diisocyanate; monomers thereof and polymer types such as burette type, nurate type, and adducts type.

The marketed products of the polyisocyanate includes Duranate 24A-90PX (NCO:23.6%, product name, manufactured by Asahi Kasei Chemicals Corporation), Sumidur N-3200-90M (product name, manufactured by Sumitomo Bayer Urethane Co., Ltd.), TAKENATE D165N-902X (product name, manufactured by Mitsui Takeda Chemicals), Sumidur N-3300, Sumidur N-3500 (product name, manufactured by Sumitomo Bayer Urethane Co., Ltd.), and Duranate THA-100 (product name, manufactured by Asahi Kasei Chemicals Corporation). According to need, blocked isocyanates that obtained by blocking these compounds can be used.

An equivalent ratio between isocyanate groups in the polyisocyanate (A-3) and sum of hydroxyl groups in the polyester polyol (A-1) and hydroxyl groups in the acrylic resin (A-2) (NCO/OH) is preferably 0.8/1 to 1.2/1. If less than 0.8/1, the obtained clear coating film may be insufficient in coating film strength. If over 1.2/1, the weather resistance and the hardness may become insufficient. The equivalent ratio (NCO/OH) is more preferably 0.9/1 to 1.1/1.

The base coating composition to be used in the present disclosure preferably contains a carbon black and/or a black dye. That is, a carbon black and/or a black dye are preferably added for coloring because the base coating composition forms a jet-black coating film.

As the carbon black, commercially available ordinary products may be used. As the black dye, known any dye including a pigment dye and solvent soluble dye may be used. As the known black dye, there are azo dyes, triphenylmethane dyes and so on. Two or more of the dyes may be used in combination.

The base coating composition preferably contains the carbon black and/or black dye of 2.0 to 15.0 weight % relative to the solid matter of coating composition.

The base coating composition may contains known compounding adjuvant, for example, an organic solvent, an inorganic solvent, an organic modifying agent, a stabilizer, a plasticizer, an additive and so on.

The base coating composition may has any form of a solvent-based coating, water-based coating, and a powder-based coating, but a solvent-based coating is most preferred because good appearance can be achieved. In addition, two-component solvent-based coating is most preferred.

The multilayer coating film of the present disclosure is a multilayer coating film comprises a clear coating film layer formed, on the base coating film formed by the base coating composition, by a clear coating composition which contains a polyester polyol (B-1) obtained by polymerization of a raw composition of a polyol having three or more functions, sebacic acid, and a diol and having a hydroxyl value of 140 to 240 mgKOH/g, an acrylic resin (B-2) with a hydroxyl value of 120 to 220 mgKOH/g, and a polyisocyanate (B-3).

One object of the present disclosure is to reduce the carbon dioxide emissions by using a plant-derived aliphatic polyester. Conventionally, a research of polylactic acid-type polyester has been done as the plant-derived aliphatic polyester. However, the hydrolysis resistance of polylactic acid is not necessarily sufficient. Therefore, when the polylactic acid-type polyester is used in the outermost layer of the multilayer coating film, sufficiently good performances in water resistance and humidity resistance cannot be obtained. From this viewpoint, a multilayer coating film excellent in water resistance and humidity resistance can be obtained by using an aliphatic polyester resin containing sebacic acid as the clear coating composition for forming the outermost layer of the multilayer coating film. Further, the crystallinity of the polyester resin can be reduced by using a polyol having three or more functions, and there is an advantage that the physical properties of coating film become better because the uniformity of coating composition can be maintained easily.

The polyester polyol (B-1) to be used in the clear coating composition comprises a polyol having three or more functions, sebacic acid, and a diol. Among them, sebacic acid is a preferred raw material from the view point of reducing carbon dioxide emission, because plant material-derived sebacic acid is widely sold.

The polyol having three or more functions includes trimethylolpropane, pentaerythritol, glycerin, mannitol, xylitol and so on.

The diol is not particularly limited but includes diols such as 1,3-propanediol, 1,4-butanediol, 1,5-pentanediol, diethylene glycol, triethylene glycol, 1,4-cyclohexanediol, 1,4-cyclohexane dimethanol, bisphenol A alkyleneoxide adducts, bisphenol S alkylene oxide adducts, and 1,2-propanediol.

The polyester polyol (B-1) preferably contains sebacic acid of 20 to 70 weight %. When the content of sebacic acid is within the above-mentioned range, the rate of plant-derived materials can be increased. The polyester polyol (B-1) preferably contains the polyol having three or more functions of 20 to 80 weight %.

The polyester polyol (B-1) preferably has a number average molecular weight of 1000 to 3500. It is preferred that the crosslinking density becomes appropriate and a coating film excellent in water resistance, humidity resistance, and chemical resistance can be formed when the number average molecular weight is within the above-mentioned range.

The polyester polyol (B-1) preferably has an acid value of 0.5 to 1.5 mgKOH/g. It is preferred that water resistance and alkali resistance become good when the acid value is within the above-mentioned range.

The polyester polyol (B-1) is obtained by polymerizing a monomer composition comprising the above-mentioned components. The monomer composition may contain other monomers within a range where the physical properties required in the present disclosure is not disturbed. The other monomer is preferably contained in a concentration of less than 70 weight %.

The polyester polyol (B-1) has a hydroxyl value of 140 to 240 mgKOH/g. When the hydroxyl value is less than 140 mgKOH/g, the crosslinking density becomes insufficient and characteristics such as water resistance and humidity resistance become insufficient. A polyester polyol having a hydroxyl value of more than 240 mgKOH/g is not suitable for the object of the present disclosure because the cure contraction becomes large and the adhesion is reduced.

The acrylic resin (B-2) has a hydroxyl value of 120 to 220 mgKOH/g. It is preferred that the crosslinking density becomes appropriate and water resistance and weather resistance are improved when the acrylic resin having the hydroxyl value within the above-mentioned range is used.

The acrylic resin (B-2) preferably has an acid value of 0.2 to 2.0 mgKOH/g. It is preferred that water resistance and alkali resistance are good when the acrylic resin having the acid value within the above-mentioned range is used.

The acrylic resin (B-2) preferably has a number average molecular weight of 2000 to 20000. It is preferred that physical properties of coating film and coating workability are good when the number average molecular weight is within the above-mentioned range.

The acrylic resin (B-2) preferably has a glass transition point of 0 to 55° C. An excellent effect in long-term stability of weather resistance and so on can be achieved when the glass transition point is within the above-mentioned range. The lower limit of the glass transition point is preferably 5° C., more preferably 10° C. The upper limit of the glass transition point is preferably 50° C., more preferably 45° C.

The acrylic resin (B-2) preferably has a weight average molecular weight of 3000 to 45000, more preferably 3500 to 35000. If the weight average molecular weight is less than 3000, physical properties of coating film tend to decrease. When the weight average molecular weight is more than 45000, coating workability tends to decrease and then finish appearance tends to decrease.

The acrylic resin (B-2) can be produced by using the same monomers as that of the acrylic resin (A-2) and following the same procedure as that of the acrylic resin (A-2).

The clear coating composition preferably contains the polyester polyol (B-!) and the acrylic resin (B-2) in weight ratio of 90:10 to 50:50. The ratio is more preferably 80:20 to 60:40. There is an advantage that physical properties of coating film can be improved sufficiently without reducing the plant-derivation degree when the ratio is within the above-mentioned range.

The base coating composition further contains a polyisocyanate (B-3) as a curing agent. The polyisocyanate described as the polyisocyanate (A-3) may be used as the polyisocyanate (B-3).

In the clear coating composition, an equivalent ratio between NCO groups in the polyisocyanate (B-3) and sum of OH groups in the polyester polyol (B-1) and OH groups in the acrylic resin (B-2) (NCO/OH) is preferably 0.8/1 to 1.2/1. If the equivalent ratio is less than 0.8/1, the obtained clear coating film may be insufficient in coating film strength. If over 1.2/1, the weather resistance and the hardness may become insufficient. The equivalent ratio (NCO/OH) is more preferably 0.9/1 to 1.1/1.

The clear coating composition may contains known compounding adjuvant, for example, an organic solvent, an inorganic solvent, an organic modifying agent, a stabilizer, a plasticizer, an additive and so on.

The multilayer coating film is preferably formed by a method comprising a step (1) of forming a base coating film layer by the base coating composition, a step (2) of forming a clear coating film layer on the base coating film layer formed in the step (1) by a clear coating composition in a dry-on-wet or a wet-on-wet manner, and a step (3) of curing the base coating film layer and the clear coating film layer. The multilayer coating film formed by such a method can be formed efficiency and can exhibit the above-mentioned effects.

A coating method for forming the base coating film layer and the clear coating film layer is not particularly restricted but includes, for example, spray coating method, electrostatic coating method, and so on. Industrially, there may be mentioned methods using an air electrostatic spray coating machine commonly known as "react gun", or rotary atomization electrostatic coating machines commonly known as "micro bell", "micro bell", and "metallic bell".

In the step (1), the coating is preferably proceeded in such a way that the dried film thickness of the base coating film layer is 5 to 40 μm. The dried film thickness is more preferably 10 to 25 μm. When the film thickness is less than 5 μm, satisfactory blackness may not be obtained. If over 40 μm, troubles such as sagging, foaming and so on may be generated.

The step (2) of forming the clear coating film layer is performed after the base coating film layer is formed. The dried film thickness of the clear coating film is preferably 10 to 50 μm. A lowering of appearance such as a surface roughness and an inferior workability such as sagging, and foaming may be generated when the dried film thickness is out of the above-mentioned range.

In the method for forming the multilayer coating film of the present disclosure, a coating method may be a wet-on-wet method or a dry-on-wet method. That is, the clear coating film layer may be formed after the base coating film layer is formed in the step (1) and heat-cured, or the clear coating film layer may be formed without heat-curing followed by curing the two layers at the same time.

A baking temperature in the step (3) is preferably 110 to 130° C. for example, in consideration of a balance with a rapid curing and a deformation prevention of plastic moldings. The temperature is preferably 120 to 130° C. A baking time is usually 10 to 60 minutes, preferably 15 to 50 minutes, and more preferably 20 to 40 minutes. When the baking time is less than 10 minutes, the curing of a coating film is insufficient and characteristics of cured coating film such as water resistance and solvent resistance deteriorate. On the other hand, if the baking time is over 60 minutes, adhesion after recoating is reduced because of an excess curing and the total time for coating steps becomes long to increase an energy cost. The baking time means the time to maintain actually the desired baking temperature on a substrate surface, more specifically, means the time to maintain the desired temperature after the baking temperature reaches at the desired degree without considering the time before the baking temperature reaches at the desired degree. When the multilayer coating film is formed by a dry-on-wet method, baking conditions for curing the base coating film layer may be the same as the above-mentioned conditions.

A heating device for baking an uncured film of coating includes, for example, drying furnaces using heat sources such as a hot wind, an electricity, gas, an infrared right, and it is preferred to use drying furnaces using two or more of these heat sources because a drying time becomes shorter.

A plastic molding that is to be applied the method for forming the multilayer coating film of the present disclosure is not particularly limited but includes, for example, interior parts for automobiles. In addition, a plastic material is not particularly limited but includes, for example, polyolefin such as polyethylene and polypropylene, polystyrene, ABS, vinyl chloride, polycarbonate, polyacetal, polyester, polyamide, polyurethane, PPO, polymethyl methacrylate, epoxy resin, phenol resin, and melamine resin. Especially, the method is suitable for coating of ABS resin parts. The substrate mentioned above may be subjected to known pretreatments before coating if necessary.

EXAMPLE

Hereinafter, the present disclosure will be described in more detail by way of examples, but the present disclosure is not limited to these examples. In examples, "part" and "%" mean "weight part" and "weight %" respectively, unless otherwise specified.

Production Example 1

Production Example of Polyester Polyol (B-1) for Clear Coating Composition

Trimethylolpropane 135 g, 1,3-propanediol 114 g, sebacic acid 404 g, xylene 42 g, and p-toluenesulfonic acid 1.2 g were put into a 1 L-separable flask equipped with a temperature controller, a stirring blade, a nitrogen gas inlet, Dean-Stark trap, and a reflux condenser. The Dean-Stark trap was filled up with xylene to the upper limit. Under nitrogen gas flow, the system inside was heated to 140° C. and maintained for an hour, and then heated to 195° C. to maintain the condensation reaction for 5 hours. After confirming that resin acid value reached 4 mgKOH/g (resin solid matter), the cooling was started. After cooling, the solid fraction was adjusted to 70% by adding butyl acetate. The hydroxyl value was 195 mgKOH/g.

Production Example 2

Production Example of Polyester Polyol (B-1) for Clear Coating Composition

Trimethylolpropane 135 g, 1,3-propanediol 144.4 g, sebacic acid 404 g, xylene 42 g, and p-toluenesulfonic acid 1.2 g were put into the same reaction vessel as that of reference example 1. The Dean-Stark trap was filled up with xylene to the upper limit. Under nitrogen gas flow, the system inside was heated to 140° C. and maintained for an hour, and then heated to 195° C. to maintain the condensation reaction for 5 hours. After confirming that resin acid value reached 4 mgKOH/g (resin solid matter), the cooling was started. After cooling, the solid fraction was adjusted to 70% by adding butyl acetate. The hydroxyl value was 259 mgKOH/g.

Production Example 3

Production Example of Polyester Polyol (B-1) for Clear Coating Composition

Trimethylolpropane 135 g, 1,3-propanediol 114 g, sebacic acid 484.8 g, xylene 42 g, and p-toluenesulfonic acid 1.2 g were put into the same reaction vessel as that of reference example 1. The Dean-Stark trap was filled up with xylene to the upper limit. Under nitrogen gas flow, the system inside was heated to 140° C. and maintained for an hour, and then heated to 195° C. to maintain the condensation reaction for 5 hours. After confirming that resin acid value reached 4 mgKOH/g (resin solid matter), the cooling was started. After cooling, the solid fraction was adjusted to 70% by adding butyl acetate. The hydroxyl value was 106 mgKOH/g.

Production Example 4

Production Example of Acrylic Resin (B-2) for Clear Coating Composition

Butyl acetate 300 g was put into a 1 L-separable flask equipped with a temperature controller, a stirring blade, a nitrogen gas inlet, and a reflux condenser and heated to 120° C. A mixture containing styrene 96.0 g, 2-ethylhexyl acrylate 61.3 g, 2-ethylhexyl methacrylate 130.0 g, hydroxyethyl methacrylate 189.3 g, methacrylic acid 3.4 g, and 2,2'-azobis (2,4-dimethyl-valeronitrile) 36.0 g was added by drops for 3 hours. After the reaction was maintained for 1 hour, a mixture of butyl acetate 20.0 g and 2,2'-azobis(2,4-dimethyl-valeronitrile) 2.0 g was added by drops for 30 minutes and the mixture was kept for 1.5 hours at 120° C. As the result of measuring the molecular weight of the obtained resin by GPC, Mw was 6200 and Mn was 3200. The glass transition temperature was 20, the hydroxyl value was 170 mgKOH/g, and the solid fraction was 60%.

Production Example 5

Production Example of Acrylic Resin (B-2) for Clear Coating Composition

Butyl acetate 300 g was put into a 1 L-separable flask equipped with a temperature controller, a stirring blade, a nitrogen gas inlet, and a reflux condenser and heated to 120°

C. A mixture containing styrene 83.2 g, 2-ethylhexyl methacrylate 276.5 g, hydroxyethyl methacrylate 116.9 g, methacrylic acid 3.4 g, and 2,2'-azobis(2,4-dimethyl-valeronitrile) 36.0 g was added by drops for 3 hours. After the reaction was maintained for 1 hour, a mixture of butyl acetate 20.0 g and 2,2'-azobis(2,4-dimethyl-valeronitrile) 2.0 g was added by drops for 30 minutes and the mixture was kept for 1.5 hours at 120° C. As the result of measuring the molecular weight of the obtained resin by GPC, Mw was 6620 and Mn was 3420. The glass transition temperature was 20, the hydroxyl value was 105 mgKOH/g, and the solid fraction was 60%.

Production Example 6

Production Example of Acrylic Resin (B-2) for Clear Coating Composition

Butyl acetate 300 g was put into a 1 L-separable flask equipped with a temperature controller, a stirring blade, a nitrogen gas inlet, and a reflux condenser and heated to 120° C. A mixture containing styrene 95.9 g, 2-ethylhexyl acrylate 113.5 g, hydroxyethyl methacrylate 267.2 g, methacrylic acid 3.4 g, and 2,2'-azobis(2,4-dimethyl-valeronitrile) 36.0 g was added by drops for 3 hours. After the reaction was maintained for 1 hour, a mixture of butyl acetate 20.0 g and 2,2'-azobis(2,4-dimethyl-valeronitrile) 2.0 g was added by drops for 30 minutes and the mixture was kept for 1.5 hours at 120° C. As the result of measuring the molecular weight of the obtained resin by GPC, Mw was 6200 and Mn was 3200. The glass transition temperature was 20, the hydroxyl value was 240 mgKOH/g, and the solid fraction was 60%.

Production Example 7

Production of Polyester Polyol (A-1) for Base Coating Composition

Trimethylolpropane 77.4 g, L-lactic acid 727.8 g, xylene 50.0 g, and p-toluenesulfonic acid 0.15 g were put into the same reaction vessel as that of production example 5. The Dean-Stark trap was filled up with xylene to the upper limit. Under nitrogen gas flow, the system inside was heated to 140° C. and maintained for an hour, and then heated to 195° C. to maintain the condensation reaction for 5 hours. After confirming that resin acid value reached 4 mgKOH/g (resin solid matter), the cooling was started. After cooling, the solid fraction was adjusted to 70% by adding butyl acetate. As the result of measuring the molecular weight of the obtained resin by GPC, Mw was 1420 and Mn was 1220. The hydroxyl value was 147 mgKOH/g.

Production Example 8

Production of Polyester Polyol (A-1) for Base Coating Composition

Pentaerythritol 78.6 g, L-lactic acid 727.8 g, xylene 50.0 g, and p-toluenesulfonic acid 0.15 g were put into the same reaction vessel as that of reference example 5. The Dean-Stark trap was filled up with xylene to the upper limit. Under nitrogen gas flow, the system inside was heated to 140° C. and maintained for an hour, and then heated to 195° C. to maintain the condensation reaction for 5 hours. After confirming that resin acid value reached 4 mgKOH/g (resin solid matter), the cooling was started. After cooling, the solid fraction was adjusted to 70% by adding butyl acetate. As the result of measuring the molecular weight of the obtained resin by GPC, Mw was 1420 and Mn was 1220. The hydroxyl value was 196 mgKOH/g.

Production Example 9

Production of Polyester Polyol (A-1) for Base Coating Composition

Pentaerythritol 78.6 g, L-lactic acid 452.3 g, xylene 50.0 g, and p-toluenesulfonic acid 0.15 g were put into the same reaction vessel as that of reference example 5. The Dean-Stark trap was filled up with xylene to the upper limit. Under nitrogen gas flow, the system inside was heated to 140° C. and maintained for an hour, and then heated to 195° C. to maintain the condensation reaction for 5 hours. After confirming that resin acid value reached 4 mgKOH/g (resin solid matter), the cooling was started. After cooling, the solid fraction was adjusted to 70% by adding butyl acetate. As the result of measuring the molecular weight of the obtained resin by GPC, Mw was 1420 and Mn was 1220. The hydroxyl value was 231 mgKOH/g.

Production Example 10

Production of Polyester Polyol (A-1) for Base Coating Composition

Trimethylolpropane 77.4 g, L-lactic acid 1091.7 g, xylene 50.0 g, and p-toluenesulfonic acid 0.15 g were put into the same reaction vessel as that of reference example 5. The Dean-Stark trap was filled up with xylene to the upper limit. Under nitrogen gas flow, the system inside was heated to 140° C. and maintained for an hour, and then heated to 195° C. to maintain the condensation reaction for 5 hours. After confirming that resin acid value reached 4 mgKOH/g (resin solid matter), the cooling was started. After cooling, the solid fraction was adjusted to 70% by adding butyl acetate. As the result of measuring the molecular weight of the obtained resin by GPC, Mw was 1420 and Mn was 1220. The hydroxyl value was 102 mgKOH/g.

Production Example 11

Production of Polyester Polyol (A-1) for Base Coating Composition

Pentaerythritol 78.6 g, L-lactic acid 374.5 g, xylene 50.0 g, and p-toluenesulfonic acid 0.15 g were put into the same reaction vessel as that of reference example 5. The Dean-Stark trap was filled up with xylene to the upper limit. Under nitrogen gas flow, the system inside was heated to 140° C. and maintained for an hour, and then heated to 195° C. to maintain the condensation reaction for 5 hours. After confirming that resin acid value reached 4 mgKOH/g (resin solid matter), the cooling was started. After cooling, the solid fraction was adjusted to 70% by adding butyl acetate. As the result of measuring the molecular weight of the obtained resin by GPC, Mw was 1420 and Mn was 1220. The hydroxyl value was 271 mgKOH/g.

Production Example 12

Production of Polyester Polyol (A-1) for Base Coating Composition

PLACCEL 308 manufactured by DAICEL CHEMICAL INDUSTRIES LTD. (hydroxyl value 198 mgKOH/g) was mixed with butyl acetate and the solid fraction was adjusted to 70%.

Production Example 13

Production of Acrylic Resin (A-2) for Base Coating Composition

Isobutyl acetate 360 g was put into a 1 L-separable flask equipped with a temperature controller, a stirring blade, a nitrogen gas inlet, and a reflux condenser and heated to 110° C. A mixture containing methyl methacrylate 272.4 g, n-butylacrylate 54.4 g, cyclohexyl methacrylate 33.6 g, hydroxyethyl methacrylate 37.2 g, methacrylic acid 2.4 g, and azobisisobuthyronitril 12.0 g was added by drops for 3 hours. After the reaction was maintained for 1 hour, a mixture of isobutyl acetate 40.0 g and azobisisobuthyronitril 1.2 g was added by drops for 30 minutes and the mixture was kept for 2 hours at 110° C. As the result of measuring the molecular weight of the obtained resin by GPC, Mw was 31300 and Mn was 11100. The glass transition temperature was 64° C. the hydroxyl value was 40 mgKOH/g, and the solid fraction was 60%.

Production Example 14

Production of Acrylic Resin (A-2) for Base Coating Composition

Isobutyl acetate 360 g was put into a 1 L-separable flask equipped with a temperature controller, a stirring blade, a nitrogen gas inlet, and a reflux condenser and heated to 110° C. A mixture containing methyl methacrylate 232.0 g, n-butylacrylate 72.4 g, cyclohexyl methacrylate 33.6 g, hydroxyethyl methacrylate 59.6 g, methacrylic acid 2.4 g, and azobisisobuthyronitril 12.0 g was added by drops for 3 hours. After the reaction was maintained for 1 hour, a mixture of isobutyl acetate 40.0 g and azobisisobuthyronitril 1.2 g was added by drops for 30 minutes and the mixture was kept for 2 hours at 110° C. As the result of measuring the molecular weight of the obtained resin by GPC, Mw was 30200 and Mn was 10500. The glass transition temperature was 52° C. the hydroxyl value was 64 mgKOH/g, and the solid fraction was 60%.

Production Example 15

Production of Acrylic Resin (A-2) for Base Coating Composition

Isobutyl acetate 360 g was put into a 1 L-separable flask equipped with a temperature controller, a stirring blade, a nitrogen gas inlet, and a reflux condenser and heated to 110° C. A mixture containing methyl methacrylate 179.6 g, n-butylacrylate 147.2 g, cyclohexyl methacrylate 33.6 g, hydroxyethyl methacrylate 37.2 g, methacrylic acid 2.4 g, and azobisisobuthyronitril 12.0 g was added by drops for 3 hours. After the reaction was maintained for 1 hour, a mixture of isobutyl acetate 40.0 g and azobisisobuthyronitril 1.2 g was added by drops for 30 minutes and the mixture was kept for 2 hours at 110° C. As the result of measuring the molecular weight of the obtained resin by GPC, Mw was 29200 and Mn was 10100. As the result of measuring the molecular weight of the obtained resin by GPC, Mw was 29200 and Mn was 10100. The glass transition temperature was 20° C., the hydroxyl value was 40 mgKOH/g, and the solid fraction was 60%.

Production Example 16

Production of Acrylic Resin (A-2) for Base Coating Composition

Isobutyl acetate 360 g was put into a 1 L-separable flask equipped with a temperature controller, a stirring blade, a nitrogen gas inlet, and a reflux condenser and heated to 110° C. A mixture containing methyl methacrylate 242.4 g, n-butylacrylate 118.0 g, cyclohexyl methacrylate 33.6 g, hydroxyethyl methacrylate 37.2 g, methacrylic acid 2.4 g, and azobisisobuthyronitril 12.0 g was added by drops for 3 hours. After the reaction was maintained for 1 hour, a mixture of isobutyl acetate 40.0 g and azobisisobuthyronitril 1.2 g was added by drops for 30 minutes and the mixture was kept for 2 hours at 110° C. As the result of measuring the molecular weight of the obtained resin by GPC, Mw was 32000 and Mn was 11100. The glass transition temperature was 88° C., the hydroxyl value was 40 mgKOH/g, and the solid fraction was 60%.

Production Example 17

Production of Acrylic Resin (A-2) for Base Coating Composition

Isobutyl acetate 360 g was put into a 1 L-separable flask equipped with a temperature controller, a stirring blade, a nitrogen gas inlet, and a reflux condenser and heated to 110° C. A mixture containing methyl methacrylate 264.4 g, n-butylacrylate 81.2 g, cyclohexyl methacrylate 33.6 g, hydroxyethyl methacrylate 18.4 g, methacrylic acid 2.4 g, and azobisisobuthyronitril 12.0 g was added by drops for 3 hours. After the reaction was maintained for 1 hour, a mixture of isobutyl acetate 40.0 g and azobisisobuthyronitril 1.2 g was added by drops for 30 minutes and the mixture was kept for 2 hours at 110° C. As the result of measuring the molecular weight of the obtained resin by GPC, Mw was 32600 and Mn was 10900. The glass transition temperature was 52° C. the hydroxyl value was 20 mgKOH/g, and the solid fraction was 60%.

Production Example 18

Production of Acrylic Resin (A-2) for Base Coating Composition

Isobutyl acetate 360 g was put into a 1 L-separable flask equipped with a temperature controller, a stirring blade, a nitrogen gas inlet, and a reflux condenser and heated to 110° C. A mixture containing methyl methacrylate 214.4 g, n-butylacrylate 68.0 g, cyclohexyl methacrylate 33.6 g, hydroxyethyl methacrylate 81.6 g, methacrylic acid 2.4 g, and azobisisobuthyronitril 12.0 g was added by drops for 3 hours. After the reaction was maintained for 1 hour, a mixture of isobutyl acetate 40.0 g and azobisisobuthyronitril 1.2 g was added by drops for 30 minutes and the mixture was kept for 2 hours at 110° C. As the result of measuring the molecular weight of the obtained resin by GPC, Mw was 29800 and Mn was 10700. The glass transition temperature was 52° C. the hydroxyl value was 88 mgKOH/g, and the solid fraction was 60%.

The physical properties of the resins obtained in the production examples 1 to 18 are shown in table 1.

TABLE 1

|  |  | OHV (mgKOH/g) | Tg (° C.) | OH | Plant-derivation degree (%-solid) |
|---|---|---|---|---|---|
| Production example 1 | (B-1) | 195 | — | — | 79.3 |
| Production example 2 | (B-1) | 259 | — | — | 80.2 |

TABLE 1-continued

|  |  | OHV (mgKOH/g) | Tg (° C.) | OH | Plant-derivation degree (%-solid) |
|---|---|---|---|---|---|
| Production example 3 | (B-1) | 106 | — | — | 81.3 |
| Production example 4 | (B-2) | 170 | 20 | — | 0 |
| Production example 5 | (B-2) | 105 | 20 | — | 0 |
| Production example 6 | (B-2) | 240 | 20 | — | 0 |
| Production example 7 | (A-1) | 147 | — | Secondary | 90.4 |
| Production example 8 | (A-1) | 196 | — | Secondary | 90.3 |
| Production example 9 | (A-1) | 231 | — | Secondary | 85.2 |
| Production example 10 | (A-1) | 102 | — | Secondary | 93.4 |
| Production example 11 | (A-1) | 271 | — | Secondary | 82.7 |
| Production example 12 | (A-1) | 198 | — | Primary | 0 |
| Production example 13 | (A-2) | 40 | 64 | Primary | 0 |
| Production example 14 | (A-2) | 64 | 52 | Primary | 0 |
| Production example 15 | (A-2) | 40 | 20 | Primary | 0 |
| Production example 16 | (A-2) | 40 | 88 | Primary | 0 |
| Production example 17 | (A-2) | 20 | 52 | Primary | 0 |
| Production example 18 | (A-2) | 88 | 52 | Primary | 0 |

(Measurement Method of Tg)

The value measured by the following processes using differential scanning calorimeter (DSC) (thermal analysis equipment SSC5200 (manufactured by Seiko Instruments inc.)) was used as the Tg value in the table 1. That is, a process of heating from 20 to 150° C. at heating rate of 10° C./min. (process 1), a process of cooling from 150 to −50° C. at cooling rate of 10° C./min. (process 2), and a process of heating from −50 to 150° C. at heating rate of 10° C./min. were done in order, and the value was obtained in the process 3. That is, the temperature indicated by the arrow of chart in the FIG. 1 was determined as Tg.

Production Example 19

Preparation of Pigment Dispersion Paste

Monarch 1300 (carbon black manufactured by Cabot Corporation) 50.0 g, BYK-182 (pigment dispersant manufactured by BYK) 40.0 g, resin of production example 4 71.4 g, and butyl acetate 338.6 g were put into a 2 L-sand grinder mill, and glass beads 750.0 g was added to homogenize the mixture for 2 hours with cold water cooling and then the glass beads were filtered by wire netting.

Preparation of Base Coating Composition

Polyester polyol (B-1) and acrylic resin (B-2) were weighed such that the solid total amount was 92 g, dibutyltin dilaurate (1.0% butyl acetate solution) 3.0 g, BYK-310 (surface conditioner manufactured by BYK) 1.0 g, and pigment dispersion paste 82.0 g of production example 8 were added thereto to homogenize. Then, a curing agent Duranate H-2523 was added to obtain a base coating composition having OH/NCO ratio of 1/1. The solid total amount of the polyester polyol (B-1) and the acrylic resin (B-2) was 100 g. When the base coating composition was applied, the viscosity thereof was adjusted to be spray-coated by using Ford cup. A mixing ratio between the polyester polyol (B-1) and the acrylic resin (B-2) was adjusted so that the solid weight ratio in the obtained coating composition become the ratio shown in tables 2 and 3.

Preparation of Clear Coating Composition

Polyester polyol (A-1) and acrylic resin (A-2) were weighed such that the solid total amount was 100 g, methyl isobutyl ketone 38.8 g, BYK-310 (surface conditioner manufactured by BYK) 1.0 g, 10 g of TINUVIN 292, 2.0 g of TINUVIN 384-2, dibutyltin dilaurate (1.0% butyl acetate solution) 3.0 g, and butyl acetate 19.4 g were added thereto to homogenize. Then, a curing agent Duranate H-2523 was added to obtain a base coating composition having OH/NCO ratio of 1/1. When the clear coating composition was applied, the viscosity thereof was adjusted to be spray-coated by using Ford cup. A mixing ratio between the polyester polyol (A-1) and the acrylic resin (A-2) was adjusted so that the solid weight ratio in the obtained coating composition become the ratio shown in tables 2 and 3.

Preparation of Multilayer Coating Film

First, the base coating composition was applied on an ABS substrate by spray coating, in such a way that the dried film thickness was 20 to 25 μm and left at room temperature for 5 minutes. Next, a clear coating composition was spray coated to obtain dried film thickness of 30 to 35 μm and left at room temperature for 5 minutes followed by baking at 80° C. for 30 minutes.

Examples 1 to 6

Base coating compositions and clear coating compositions were prepared by using the resins in the rate shown in Table 2 and every multilayer coating film was formed in the above-mentioned manner. The obtained multilayer coating film was evaluated based on the following standards. The results were shown in Table 2.

(Evaluation Items and Evaluation Methods of the Coating Film)

(Initial Adhesion)

It was evaluated according to JIS-K-5600-5-6. Specifically, 2×2 mm 100 squares were made on the coating film by using a cutter knife, an adhesive cellophane tape was attached perfectly, and then an end of the tape was lifted and peeled off upward. These peeling operation was conducted three times at the same point, the number of squares of which 50% or more area were peeled off was shown. 0 was passable (○), and 1 or more was rejection (x)

(Humidity Resistance)

It was evaluated according to JIS-K-5600-7-12. Specifically, the test object was left at the temperature of 50±2° C., and humidity of 98±2% for 24 hours, and the coating film was observed at the surface thereof and the square adhesion test was conducted. The square adhesion test comprised forming 100 squares of 2 mm on the coating film by using a cutter knife, attaching an adhesive cellophane tape perfectly thereon, and lifting the end of the tape upward followed by peeling off. These peeling operations were conducted at the same point, and the number of squares in which 50% or more area of the coating film was peeled off was shown.

○: There was no coating film surface trouble such as whitening and swelling, and the number of peeled off points was 0.

x: There was some coating film surface trouble such as whitening and swelling, or the number of peeled off points was 1 or more.

(Water Resistance)

It was evaluated according to JIS-K-5600-6-1. Specifically, a cylindrical ring was arranged on the coating film surface, distillated water 5 mL was added and put a glass plate over the ring. It was left at 55° C. for 4 hours. After water washing, the coating film surface was observed.

○: There was no coating film surface trouble such as whitening and swelling.

x: There was some coating film surface trouble such as whitening and swelling.

(Surface Smoothness)

It was evaluated by using the values of W1, W2, W3 and W4 measured by Wave Scan-T manufactured by BYK-Gardner.

TABLE 2

|  |  | Example 1 | Example 2 | Example 3 | Example 4 | Example 5 | Example 6 |
|---|---|---|---|---|---|---|---|
| Resin for clear coating film | Production example 1 | 80 | 80 | 80 | 60 | 60 | 60 |
|  | Production example 2 |  |  |  |  |  |  |
|  | Production example 3 |  |  |  |  |  |  |
|  | Production example 4 | 20 | 20 | 20 | 40 | 40 | 40 |
|  | Production example 5 |  |  |  |  |  |  |
|  | Production example 6 |  |  |  |  |  |  |
| Resin for base coating film | Production example 7 | 80 |  |  | 60 |  |  |
|  | Production example 8 |  | 80 |  |  | 60 |  |
|  | Production example 9 |  |  | 80 |  |  | 60 |
|  | Production example 10 |  |  |  |  |  |  |
|  | Production example 11 |  |  |  |  |  |  |
|  | Production example 12 |  |  |  |  |  |  |
|  | Production example 13 | 20 | 20 | 20 |  |  |  |
|  | Production example 14 |  |  |  | 40 | 40 | 40 |
|  | Production example 15 |  |  |  |  |  |  |
|  | Production example 16 |  |  |  |  |  |  |
|  | Production example 17 |  |  |  |  |  |  |
|  | Production example 18 |  |  |  |  |  |  |
| Evaluation result | Adhesion | ○ | ○ | ○ | ○ | ○ | ○ |
|  | Water resistance | ○ | ○ | ○ | ○ | ○ | ○ |
|  | Humidity resistance | ○ | ○ | ○ | ○ | ○ | ○ |
|  | W1 | 1.1 | 1.0 | 1.1 | 1.3 | 1.2 | 1.4 |
|  | W2 | 0.1 | 0.1 | 0.1 | 0.1 | 0.1 | 0.1 |
|  | W3 | 2.3 | 2.3 | 2.4 | 2.6 | 2.4 | 2.5 |
|  | W4 | 1.8 | 1.7 | 1.7 | 1.8 | 1.7 | 1.8 |
| Plant-derivation degree | Clear | 37.6 | 37.8 | 37.8 | 28.6 | 28.6 | 28.6 |
|  | Base | 45.9 | 42.3 | 37.8 | 36.1 | 33.8 | 30.5 |

Comparative Examples 1 to 12

Multilayer coating films were formed by following the same procedure as that of examples 1 to 6 based on the compositions shown in Table 3 and evaluated. The results were shown in Table 3.

TABLE 3

|  | Production example No. | Comparative example No. |  |  |  |  |  |  |  |  |  |  |  |
|---|---|---|---|---|---|---|---|---|---|---|---|---|---|
|  |  | 1 | 2 | 3 | 4 | 5 | 6 | 7 | 8 | 9 | 10 | 11 | 12 |
| Resin for clear coating film | 1 |  |  | 60 | 60 | 60 | 60 | 60 | 60 | 60 | 60 | 60 | 60 |
|  | 2 | 60 |  |  |  |  |  |  |  |  |  |  |  |
|  | 3 |  | 60 |  |  |  |  |  |  |  |  |  |  |
|  | 4 | 40 | 40 |  |  | 40 | 40 | 40 | 40 | 40 | 40 | 40 | 40 |
|  | 5 |  |  | 40 |  |  |  |  |  |  |  |  |  |
|  | 6 |  |  |  | 40 |  |  |  |  |  |  |  |  |

TABLE 3-continued

| | Production example No. | Comparative example No. | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Resin for base coating film | 7 | | | | | | | | | | | | |
| | 8 | 60 | | 60 | 60 | | | | | 60 | 60 | 60 | 60 |
| | 9 | | 60 | | | | | | | | | | |
| | 10 | | | | | 60 | | | | | | | |
| | 11 | | | | | | 60 | | | | | | |
| | 12 | | | | | | | 60 | | | | | |
| | 13 | | | | | | | | | | | | |
| | 14 | 40 | 40 | 40 | 40 | 40 | 40 | 40 | 100 | | | | |
| | 15 | | | | | | | | | 40 | | | |
| | 16 | | | | | | | | | | 40 | | |
| | 17 | | | | | | | | | | | 40 | |
| | 18 | | | | | | | | | | | | 40 |
| Evaluation result | Adhesion | X | ○ | ○ | X | ○ | X | ○ | ○ | X | ○ | ○ | X |
| | Water resistance | ○ | ○ | ○ | ○ | ○ | ○ | X | ○ | ○ | ○ | X | ○ |
| | Humidity resistance | ○ | X | X | ○ | X | ○ | X | ○ | ○ | X | X | ○ |
| | W1 | 1.5 | 1.4 | 1.5 | 1.6 | 1.4 | 1.6 | 3.6 | 4.8 | 1.5 | 1.4 | 1.5 | 1.6 |
| | W2 | 0.2 | 0.1 | 0.1 | 0.2 | 0.2 | 0.2 | 3.4 | 4.2 | 0.2 | 0.2 | 0.1 | 0.2 |
| | W3 | 2.6 | 2.5 | 2.4 | 2.5 | 2.5 | 2.5 | 7.2 | 9.4 | 2.5 | 2.6 | 2.5 | 2.4 |
| | W4 | 1.8 | 1.8 | 1.8 | 1.8 | 1.8 | 1.9 | 3.3 | 4.0 | 1.8 | 1.8 | 1.9 | 1.9 |
| Plant-derivation degree | Clear | 29.2 | 36.6 | 30.2 | 27.1 | 28.6 | 28.6 | 28.6 | 28.6 | 28.6 | 28.6 | 28.6 | 28.6 |
| | Base | 33.1 | 29.8 | 33.1 | 33.1 | 38.8 | 27.7 | 0.0 | 0.0 | 33.8 | 35.0 | 34.4 | 32.5 |

It is clear from results of examples and comparative examples that the multilayer coating films of the present disclosure have excellent characteristics in all adhesion, water resistance, humidity resistance and gloss, but multilayer coating films of comparative examples are unfavorable in every physical property.

INDUSTRIAL APPLICABILITY

The jet-black multilayer coating film of the present disclosure can be used suitably for coating automobile interior parts.

The invention claimed is:

1. A jet-black multilayer coating film, comprising:
   a base coating film layer formed by a base coating composition which contains:
   a polyester polyol (A-1) obtained by polymerization of a raw composition of a polyol having three or more functional groups and a lactic acid, wherein a total of the polyol having three or more functional groups and the lactic acid is 80 mol % or more of the polyester polyol (A-1); the polyester polyol (A-1) has a hydroxyl value of 140 to 240 mgKOH/g; 70 mol % or more of the hydroxyl groups of the polyester polyol (A-1) are secondary hydroxyl groups; and a ratio of the polyol having three or more functional groups and the lactic acid in the polyester polyol (A-1) is 1/8 to 1/15 on a molar ratio,
   an acrylic resin (A-2) having a hydroxyl value of 30 to 80 mgKOH/g and a glass transition point of 40 to 80° C., and
   a polyisocyanate (A-3), and
   a clear coating film layer formed on said base coating film layer by a clear coating composition which contains:
   a polyester polyol (B-1) obtained by polymerization of a raw composition of a polyol having three or more functional groups, a sebacic acid, and a diol, wherein the polyester polyol (B-1) has a hydroxyl value of 140 to 240 mgKOH/g; and the sebacic acid is 20 to 70 weight % of the polyester polyol (B-1),
   an acrylic resin (B-2) having a hydroxyl value of 120 to 220 mgKOH/g, and
   a polyisocyanate (B-3).

2. The jet-black multilayer coating film according to claim 1, wherein the base coating composition contains a carbon black and/or a black dye.

3. A method for forming a jet-black multilayer coating film, comprising:
   a step (1) of forming a base coating film layer by a base coating composition which contains
   a polyester polyol (A-1) obtained by polymerization of a raw composition of a polyol having three or more functional groups and a lactic acid, wherein a total of the polyol having three or more functional groups and the lactic acid is 80 mol % or more of the polyester polyol (A-1); the polyester polyol (A-1) has a hydroxyl value of 140 to 240 mgKOH/g; 70 mol % or more of the hydroxyl groups of the polyester polyol (A-1) are secondary hydroxyl groups; and a ratio of the polyol having three or more functional groups and the lactic acid in the polyester polyol (A-1) is 1/8 to 1/15 on a molar ratio,
   an acrylic resin (A-2) having a hydroxyl value of 30 to 80 mgKOH/g and a glass transition point of 40 to 80° C., and
   a polyisocyanate (A-3),
   a step (2) of forming a clear coating film layer on said base coating film layer, by a dry-on-wet or a wet-on-wet method, by a clear coating composition which contains:
   a polyester polyol (B-1) obtained by polymerization of a raw composition of a polyol having three or more functional groups, a sebacic acid, and a diol, wherein the polyester polyol (B-1) has a hydroxyl value of 140 to 240 mgKOH/g; and the sebacic acid is 20 to 70 weight % of the polyester polyol (B-1),
   an acrylic resin (B-2) having a hydroxyl value of 120 to 220 mgKOH/g, and
   a polyisocyanate (B-3), and
   a step (3) of curing said base coating film layer and said clear coating film layer.

4. The method for forming a jet-black multilayer coating film according to claim 1, wherein the base coating composition contains a carbon black and/or a black dye.

* * * * *